(12) United States Patent
Simon et al.

(10) Patent No.: US 10,735,741 B2
(45) Date of Patent: Aug. 4, 2020

(54) METHOD, DEVICE, AND COMPUTER PROGRAM PRODUCT FOR COMPRESSING AN INPUT DATA SET

(71) Applicant: Universitat Stuttgart, Stuttgart (DE)

(72) Inventors: Sven Simon, Ludwigsburg (DE); Thomas Richter, Erlangen (DE); Zhe Wang, Stuttgart (DE); Yousef Baroud, Stuttgart (DE); Mahdi Najmabadi, Stuttgart (DE)

(73) Assignee: Universität Stuttgart, Stuttgart (DE)

( * ) Notice: Subject to any disclaimer, the term of this patent is extended or adjusted under 35 U.S.C. 154(b) by 232 days.

(21) Appl. No.: 15/752,161

(22) PCT Filed: Aug. 5, 2016

(86) PCT No.: PCT/EP2016/001353
§ 371 (c)(1),
(2) Date: Feb. 23, 2018

(87) PCT Pub. No.: WO2017/025182
PCT Pub. Date: Feb. 16, 2017

(65) Prior Publication Data
US 2018/0242003 A1    Aug. 23, 2018

(30) Foreign Application Priority Data
Aug. 10, 2015 (DE) .................. 10 2015 010 412

(51) Int. Cl.
*H04N 19/154* (2014.01)
*H04N 19/182* (2014.01)
(Continued)

(52) U.S. Cl.
CPC ......... *H04N 19/154* (2014.11); *H04N 19/124* (2014.11); *H04N 19/132* (2014.11);
(Continued)

(58) Field of Classification Search
None
See application file for complete search history.

(56) References Cited

U.S. PATENT DOCUMENTS

| 7,333,930 | B2 | 2/2008 | Baumgarte |
| 8,204,323 | B2 | 6/2012 | Tzannes et al. |
| 2007/0208557 | A1 | 9/2007 | Li et al. |
| 2010/0086063 | A1* | 4/2010 | Haskell ............... H04N 19/176 375/240.27 |

FOREIGN PATENT DOCUMENTS

WO    2005036528 A1    4/2005

OTHER PUBLICATIONS

Wang Z et al: "SSPQ—spatial domain perceptual image codec based on subsampling and perceptual quantization", 19th IEEE International Conference on Image Processing (ICIP), 2012, IEEE, Sep. 30, 2012 (Sep. 30, 2012), Seiten 1061-1064, XP032333358, DOI: 10.1109/ICIP.2012.6467046 ISBN: 978-1-4673-2534-9.
Joel Sole et al: "Transform Coefficient Coding in HEVC", IEEE Transactions on Circuits and Systems for Video Technology, IEEE Service Center, Piscataway, NJ, US, Bd. 22, Nr. 12, Dec. 1, 2012 (Dec. 1, 2012), Seiten 1765-1777, XP011487805, ISSN: 1051-8215, DOI: 10.1109/TCSVT.2012.2223055.
(Continued)

*Primary Examiner* — Lindsay J Uhl
(74) *Attorney, Agent, or Firm* — NovoTechIP International PLLC (57) ABSTRACT

The invention relates to a method for compressing an input data set, which comprises one or more input values, comprising the following steps: determining, for each input value, a tolerance range; generating encoded lossy values by a lossy encoding of the input values; generating output values associated with the input values, in particular by decoding the encoded lossy values; generating difference values by subtracting each decoded lossy value from the respectively associated input value; comparing each difference value with the respectively associated determined tolerance range; generating encoded correction values associated with the encoded lossy values on the basis of the difference values, wherein the encoded correction values are offset values, which can be added to the associated encoded (Continued)

lossy values; and providing an output data record as a function of a comparison of the difference values with the tolerance ranges and on the basis of the encoded lossy values and/or the encoded correction values.

10 Claims, 10 Drawing Sheets

(51) Int. Cl.
  *H04N 19/36* (2014.01)
  *H04N 19/132* (2014.01)
  *H04N 19/124* (2014.01)
  *H04N 19/196* (2014.01)
  *H04N 19/91* (2014.01)
(52) U.S. Cl.
  CPC ......... *H04N 19/182* (2014.11); *H04N 19/196* (2014.11); *H04N 19/36* (2014.11); *H04N 19/91* (2014.11)

(56) References Cited

OTHER PUBLICATIONS

Kai Liu: "A just noticeable distortion based perceptually lossless image compression codec", Jun. 1, 2012 (Jun. 1, 2012), XP055313903, DOI: http://dx.doi.org/10.18419/opus-2894 Gefunden im Internet: URL:http://elib.uni-stuttgart.de/bitstream/11682/2911 /1 /STUD_ 2360.pdf [gefunden am Oct. 25, 2016].

C.-H. Chou; Y.-C. Li: "A perceptually tuned subband image coder based on the measure of just-noticeable-distortion profile", Circuits and Systems for Video Technology, IEEE Transactions on, vol. 5, No. 6, Dec. 1995 (Dec. 1, 1995), (Abstract).

International Search Report and Written Opinion dated Nov. 27, 2016 by the International Searching Authority (European Patent Office) in PCT Application PCT/EP2016/001353.

\* cited by examiner

FIG. 1

(Related Art)

○ Pixel with Non-Perceivable Distortion

● Pixel with Perceivable Distortion

FIG. 7

| Pattern No. | Refinement pattern | Probability | Huffman codeword |
|---|---|---|---|
| 1 | 0000 | 0.550 | 0 |
| 2 | 0001 | 0.085 | 100 |
| 3 | 0010 | 0.085 | 101 |
| 4 | 0011 | 0.018 | 111100 |
| 5 | 0100 | 0.085 | 110 |
| 6 | 0101 | 0.017 | 1111100 |
| 7 | 0110 | 0.011 | 1111110 |
| 8 | 0111 | 0.004 | 111111100 |
| 9 | 1000 | 0.085 | 1110 |
| 10 | 1001 | 0.011 | 1111110 |
| 11 | 1010 | 0.018 | 111101 |
| 12 | 1011 | 0.003 | 111111110 |
| 13 | 1100 | 0.018 | 1111101 |
| 14 | 1101 | 0.004 | 111111101 |
| 15 | 1110 | 0.004 | 111111110 |
| 16 | 1111 | 0.002 | 111111111 |

FIG. 8

| Image | JPEG VL [bpp] | JPEG MQ [bpp] | Side info [bpp] | Total [bpp] | Gain [%] |
|---|---|---|---|---|---|
| AERIAL1 | 6.67 | 2.25 | 1.60 | 3.86 | 42.2 |
| AERIAL2 | 6.04 | 1.82 | 1.90 | 3.73 | 38.3 |
| BAND1 | 4.11 | 1.13 | 0.80 | 1.93 | 53.0 |
| BIKE | 5.05 | 1.44 | 0.74 | 2.18 | 56.8 |
| BIKE3 | 4.48 | 1.48 | 0.65 | 2.13 | 52.4 |
| CAFE | 6.29 | 2.07 | 0.95 | 3.02 | 51.9 |
| CATS | 2.88 | 0.91 | 0.59 | 1.50 | 47.8 |
| CHART | 3.58 | 1.05 | 0.43 | 1.48 | 58.7 |
| CMPND1 | 3.13 | 1.19 | 0.46 | 1.65 | 47.3 |
| CMPND2 | 3.25 | 1.21 | 0.33 | 1.54 | 52.7 |
| CMPND3 | 5.04 | 1.76 | 1.03 | 2.79 | 44.7 |
| CT | 3.08 | 0.90 | 0.13 | 1.03 | 66.5 |
| EDUC | 5.21 | 1.68 | 0.43 | 2.11 | 59.5 |
| FAXBALL | 0.69 | 0.20 | 0.05 | 0.25 | 64.2 |
| FINGER | 6.65 | 2.27 | 1.39 | 3.66 | 45.0 |
| GOLD | 5.00 | 1.35 | 0.84 | 2.20 | 56.1 |
| HOTEL | 4.98 | 1.33 | 0.63 | 1.96 | 60.6 |
| PC | 6.65 | 2.91 | 0.70 | 3.61 | 45.7 |
| TARGET | 2.81 | 1.34 | 0.46 | 1.80 | 36.1 |
| TOOLS | 6.26 | 2.01 | 1.30 | 3.31 | 47.1 |
| TXTUR1 | 8.22 | 3.08 | 2.45 | 5.54 | 32.6 |
| TXTUR2 | 6.31 | 2.02 | 1.61 | 3.63 | 42.5 |
| US | 3.21 | 1.19 | 0.29 | 1.48 | 53.8 |
| WATER | 3.55 | 0.53 | 0.48 | 1.01 | 71.7 |
| WOMAN | 5.01 | 1.40 | 0.78 | 2.18 | 56.6 |
| X_RAY | 4.21 | 0.95 | 0.89 | 1.83 | 56.5 |
| Average | 4.71 | 1.52 | 0.84 | 2.36 | 51.6 |

METHOD, DEVICE, AND COMPUTER PROGRAM PRODUCT FOR COMPRESSING AN INPUT DATA SET

This invention relates to a method, a device, and a computer program product for compressing an input data set.

Data compression is a process by which the volume of digital data is reduced. Today, data compression takes place in nearly every transmission of digital data. It helps to save resources in data transmission by transmitting the data in a form that, depending on the application, requires as little bandwidth as possible, as little transmission time as possible, and/or as little storage space as possible.

Data compression fundamentally attempts to transmit superfluous information with as few bits as possible. Added to this comes that data are first transferred into a visualization via which all or at least most information can be displayed in a shorter form. This process is performed by an encoder and the process is termed compression. With the aid of a decoder, the process can be reversed, which is termed decompression. Compression and/or decompression can be lossless or lossy.

One speaks of lossless compression when the compressed data can be used to obtain all original data again. This is the case, for example, when compressing executable program files.

With lossy compression, in contrast, the original data can no longer be obtained again from the compressed data, which means that part of the information becomes lost. Lossy processes primarily remove information that is unimportant or irrelevant for perceiving the information. These lossy processes are especially implemented for image or video compression (e.g. JPEG) or for audio file compression (e.g. MP3).

The amount of information removed in lossy compression depends on the compression rate. Especially with higher compression rates, the information reduction implemented can be so great that it is perceivable to a user or inacceptable for a technical application intended for processing the data further. Examples of where this becomes perceivable include compressed images, videos, or music files via perceivably deteriorated quality and/or the occurrence of perceivable artifacts. In technical applications, lossy compression can also lead to distorted results. For example, the values computed when determining object sizes can be distorted by lossy compression, which may render them unusable.

Therefore, the objective of this invention is to provide a compression process via which the relation between quality and compression rate can be improved and/or increased compared to conventional lossy compression processes. A further objective of this invention is to indicate a corresponding device and corresponding computer program product.

This objective is resolved via the items in the ancillary claims. Advantageous embodiments are the object of the sub-claims.

An initial independent aspect to resolving the objective relates to a process for compressing an input data set, which encompasses one or multiple input values, especially a high number of input values. The process encompasses the following steps:

For each input value, compute, i.e. determine and/or measure and/or determine a tolerance range;
Generate encoded lossy values via lossy encoding of the input values;
Generate decoded lossy values associated to the input values, particularly via decoding the encoded lossy values;
Generate differential values by subtracting each decoded lossy value from the respectively associated input value;
Compare each differential value with the respectively associated tolerance range computed;
Generate encoded correction values and/or refinement values based on the differential values; and
Supply an output data set based on a comparison of the differential values with the tolerance ranges and based on the encoded lossy values and/or encoded correction values.

In this description, the term "value" encompasses information in a very general sense. One or multiple values can also be labeled as data. One or multiple values, especially a high number of values, comprise a data set.

The input data set can consist of examples such as values and/or image data, especially grayscale values for all pixels of a black & white image or color values for a color image. Another example for an input data set can be the grayscale values for all voxels in a 3D computer tomography dataset. Likewise, the input data set can encompass level and/or frequency values for a piece of music as values in the sense implemented in this Description.

The values can especially be sample values from sources such as sensors to determine the time and/or location of a physical dimension. Examples of sensors can be image sensors or point sensors for a physical dimension, as well as an electrical field, a magnetic field, an electric charge, a mechanical force, etc.

The input dataset will preferably only encompass a subset of the values and/or data from an overall dataset, e.g. of an image or a sensor. In other words, the high number of values in the input dataset is only one subset of an overall dataset. The input dataset can encompass, for example, one or multiple bit sequences that represent the values in the input dataset. In particular, the input dataset can encompass a bit stream, i.e. an input bit stream.

Examples for the input data set in the event of an image sensor can include a block of 8×8 pixel gray values or a block of 16×16 pixel color values or an image line or even merely an individual pixel or multiple pixels.

For a point sensor, the input dataset can be, for example, a certain number of sample values that are neighboring in sequence or in location. For example, the incoming dataset can encompass ten sample values from a photo diode or twenty sample values from a hall sensor.

A tolerance range is generally understood to be a value range, i.e. a range between a minimum and a maximum value. The tolerance ranges are especially determined and/or specified such that visual lossless compression can be guaranteed or such that for a technical application that processes the compressed data further no change or only insignificant change occurs in the results received or generated by the technical application. In particular, tolerance ranges are determined such that a compressed or lossy value generated by a lossy encoder and falling within a respective tolerance range will lead to no perceivable degradation and/or distortion or only lead to insignificant perceivable degradation and/or distortion to the respective and/or associated input value. In particular, tolerance ranges are determined such that a compressed and lossy value generated by a lossy encoder and falling within the respective tolerance range will lead only to an acceptable degradation and/or distortion in the respective and/or associated input value. An acceptable distortion is understood to be a distortion that—regardless of the respective technical application—is irrelevant and/or is at most is to a dimension that the results, i.e. the compressed values received via the lossy compression, are influenced only to an extent that is insignificant and/or acceptable. In contrast, a compressed and lossy value falling outside the respective tolerance range can cause perceivable or inacceptable degradation and/or distortion to the associated input value. For technical applications, a compressed value falling outside the tolerance range can lead to divergent results, especially results that are distorted and/or inacceptable.

The tolerance range and/or tolerance ranges are preferably determined based on the input values. Furthermore, it is preferable that a so-called just-noticeable-distortion-algorithm be used for determining tolerance ranges. This kind of algorithm has the advantage of facilitating determination of the tolerance range on the basis of input values such that visually lossless compression is guaranteed. In other words, a just-noticeable-distortion-algorithm makes it possible to determine the tolerance ranges such that the compressed and lossy values generated by a lossy encoder and falling within the tolerance ranges will lead to no degradation and/or distortion and/or lead only to a degradation and/or distortion to the input dataset that is insignificant and/or not perceivable.

A tolerance range can be defined, as an example, via a maximum and a minimum value. However, it is also possible for a tolerance range to be defined solely via a tolerance limit and/or via a threshold, especially via a perception or acceptance threshold. This kind of perception or acceptance threshold indicates the deviation or difference for a lossy value compared to the original value where perceivable or inacceptable deterioration and/or distortion appears. In other words, a perception and/or acceptance threshold indicates which deviation and/or difference for a lossy value compared to the original value is possible or permissible such that this deviation or difference just barely meets the criterion of no longer being perceivable and/or just barely meets the criterion of being acceptable. If the tolerance range is defined with the aid of a threshold value, then the tolerance range can be, for example, specified using all values below or above the threshold value. The threshold value itself can be inside or outside of the tolerance range.

A tolerance range can define, for example, a permissible maximum deviation from the original value for a pixel gray value compressed via a lossy encoder; or, for example, define a permissible maximum deviation compared to the original value for a sample value from a sensor signal compressed via a lossy encoder.

The tolerance range can vary for each value. For example, when it comes to a blood pressure sensor, of primary relevance are the maximum value and the minimum value, which are determinable with a measurement uncertainty of 10%, while the precision between these values is of little relevance when it comes to sample values. Thus, the tolerance range for the intermediate values can be larger than for the limit values. When it comes to thermography for analyzing the body temperature of a human, the temperature ranges beyond the temperatures of 35° C. to 42° C. are less relevant and therefore can have a larger tolerance range, which means they can be compressed with higher losses. For example, when performing dimensional measurement based on images, the tolerance range for image edges is virtually zero, as the image edges are used for object measurement. However, outside the image edge areas, the tolerance ranges can be different than zero, provided they do not have any influence on the measurement result or only have an influence that is insignificant.

Generating encoded lossy values via lossy encoding of input values is preferably carried out with the aid of a lossy encoder, such as a JPEG encoder or an MP3 encoder. It is self-evident that in principle any existing CODEC and/or lossy encoder can be used, depending on the respective application.

Generation of the lossy decoded values associated with the input values can be performed with the aid of a decoder unit or a corresponding decoder. In particular, the lossy decoded values associated with the input values can be performed via decoding the encoded lossy values [trans note: sic.]

The generation of differential values by subtracting each decoded lossy value from the respective input value is used to determine the resulting loss and/or respective resulting distortion caused by the lossy compression and/or encoding compared to the original value.

In particular, by comparing each differential value with the respectively associated tolerance range determined, one can determine whether the differential value falls within the associated tolerance range and/or within the associated tolerance limit. Thus, comparison always uses the tolerance range relateing to the respective differential value, i.e. the tolerance range that belongs to the input value from which the differential value has been generated.

The encoded correction values generated particularly consist of offset values and/or refinement values that can be added to the associated encoded lossy input values such that the distortion caused by the output values supplied by the processes is limited and/or such that the values supplied and decoded by the processes fall within the tolerance range. As an advantage, the distortion caused by the lossy compression and/or encoding of the input values can be at least partially offset with the help of the correction and/or refinement values.

A correction value associated with an input value can be, for example, the respective differential value. Alternatively, a correction value associated with an input value can be the difference between the associated differential value and an associated tolerance limit.

Like the input dataset, the output dataset will preferably comprise one or multiple output values. For example, the output dataset can encompass one or multiple bit sequences representing the values in the output datasets. In particular, the output dataset can encompass a bit stream.

Supply of the output dataset can especially encompass an output and/or a transmission and/or a display.

With the aid of the method in this invention, it becomes possible to highly effectively perform lossy compression with the help of, for example, a well-known CODEC. As an advantage, with the aid of the tolerance range determined from the input dataset, it can be guaranteed that the output dataset supplied by the process meets a certain quality requirement. In particular, the method in this invention makes it possible to reduce and/or avoid perceivable distortions and/or artifacts associated with the lossy compression in a conventional encoder in a highly efficient manner, i.e. without heavily reducing the compression rate. Thus, the method in this invention can be used to improve and/or increase the relationship of quality and compression rate compared to conventional lossy compression processes.

In a preferred embodiment of the invention process, the generation of the encoded correction values encompasses lossless or lossy encoding and/or compression of the differential values.

For lossy compression, for example, the correction values and/or the differential values can be quantized. Alternatively, or additionally, the quantized correction values can be encoded and/or compressed with the aid of an entropy encoder.

In a further preferred embodiment, the generation of the encoded correction values encompasses lossless encoding and/or compression of the difference between the differential values and a tolerance limit, which is preferably determined with a just-noticeable-distortion-algorithm.

As an advantage, lossless encoding guarantees that all distortions from decoded output values lie within the respective tolerance ranges and/or tolerance limits.

In a further preferred embodiment, the generation of encoded correction values is performed based on a comparison of the differential values with the tolerance ranges. In other words, encoded correction values are only generated for input values whose respective differential values lie outside the respectively determined tolerance range.

Preferably, an encoded correction value is only generated if the associated differential value lies outside the associated tolerance range determined and/or the tolerance limit. As an advantage, in this manner computation time and/or computation power can be saved. Moreover, as an advantage, the data volume can be maintained low as a consequence of the correction values generated.

In a further preferred embodiment, encoded correction values are only generated for those differential values that lie outside the associated tolerance range determined. In other words, encoded correction values are only generated for those input values whose differential values lie outside the associated tolerance range determined.

In a further preferred embodiment, the supply and/or emission of the output dataset encompasses supply and/or emission of the encoded lossy values. Alternatively or additionally, the supply and/or emission of the output dataset encompasses supply and/or emission of the encoded correction values. Also alternatively or additionally, the supply and/or emission of the output dataset encompasses supply and/or emission of combined encoded values, with the combined encoded values representing a combination of the encoded lossy values and the encoded correction values.

As an advantage, the supply and/or issuance of encoded lossy values can guarantee that a conventional decoder, such as a standard JPEG decoder, can also decode and/or decompress the output data and/or the output dataset. While this does not achieve an improvement in quality, the output dataset can also be decoded and used further with a conventional decoder with the conventional quality.

The supply and/or emission of the encoded correction values and/or combined encoded values is especially an advantage when the encoded correction values and/or combined encoded values can be processed by a decoder such that the decoder is capable of supplying decoded data with improved quality.

In a further preferred embodiment, the supply and/or emission of the output dataset encompasses supply and/or emission of combined encoded values, with the combined encoded values being maintained via merging, especially a transfer and/or addition, the encoded lossy values and those encoded correction values whose associated differential values lie outside the associated tolerance range determined.

The merging and/or transfer and/or addition can be performed with, for example, the aid of a multiplexer.

A further independent aspect to resolving the objective relates to a device for compressing an input dataset, which encompasses one or multiple input values. This device encompasses:

A tolerance range determination unit for determining a tolerance range and/or a tolerance limit;

An encoder for generating encoded lossy values via lossy encoding of the input values;

A decoder unit for generating decoded lossy values associated with the input values, especially via decoding the encoded lossy values;

A subtraction unit for subtracting every decoded lossy value from the respective input value and generating differential values;

A comparison unit for comparing every differential value with the associated tolerance range determined;

A correction value generation unit for generating encoded correction values based on the differential values; and An output dataset supply unit for supplying and/or emitting an output dataset based on a comparison of the differential values with the tolerance ranges and based on the encoded lossy values and/or the encoded correction values.

In a preferred embodiment, the encoder for generating encoded lossy values is a JPEG encoder or an MP3 encoder or an MPEG encoder or an H265 encoder. In particular, the encoder for generating encoded lossy values can be a JPEG 2000, JPEG XR, or JPEG LS encoder. Alternatively or additionally, the decoding unit for generating decoded lossy values associated with the input values is preferably a decoder, e.g. a JEPG decoder or an MP3 decoder or an MPEG decoder or an H2645 decoder. In particular, the decoding unit for generating decoded lossy values associated with the input values can be a JPEG 2000, JPEG XR, or a JPEG LS decoder. Alternatively or additionally, the tolerance range determination unit is preferable designed to determine the tolerance range based on a just-noticeable distortion algorithm. Alternatively or additionally, the correction value generation unit preferably encompasses a quantization unit, especially a perceptual quantization unit, and/or an entropy encoder. Alternatively or additionally, the output dataset emission unit preferably encompasses a multiplexer, especially for generating and/or emitting combined encoded values and/or supply the output dataset, e.g. in the form of a bit stream.

A further independent aspect for resolving the objective relates to a computer program product that encompasses a machine-readable program code that, when loaded on a computer, is suitable for executing a process in line with the invention.

For the further independent aspects named above, and especially for respective preferred embodiments, the statements made above and below also apply for the embodiments of the first aspect. In particular, the statements made above and below regarding the embodiments of the other respective aspects also apply for an independent aspect of this invention and for associated preferred embodiments.

The following describes individual embodiments for resolving the objective illustratively using the figures. At times, the individually described embodiments have properties that are not necessarily needed in order to execute the claimed object, yet do provide the desired properties in certain application cases. Thus, embodiments that don't have all properties of the embodiments described in the following should also be deemed as manifested under the technical teaching described.

Furthermore, in order to avoid unnecessary repetitions, certain properties will only be mentioned in relation to individual embodiments of those described in the following. Note that the individual embodiments therefore should not be observed solely individually but rather also in an overall view. In application of this overall view, an expert will recognize that individual embodiments can also be modified by including individual or multiple properties of other embodiments. Note that a systematic combination of the individual embodiment with individual or multiple properties described in relation to other embodiments can be desirable and sensible, and therefore should be taken into consideration and also deemed to be encompasses by the description.

DETAILED DESCRIPTION OF THE FIGURES

Figure 1:
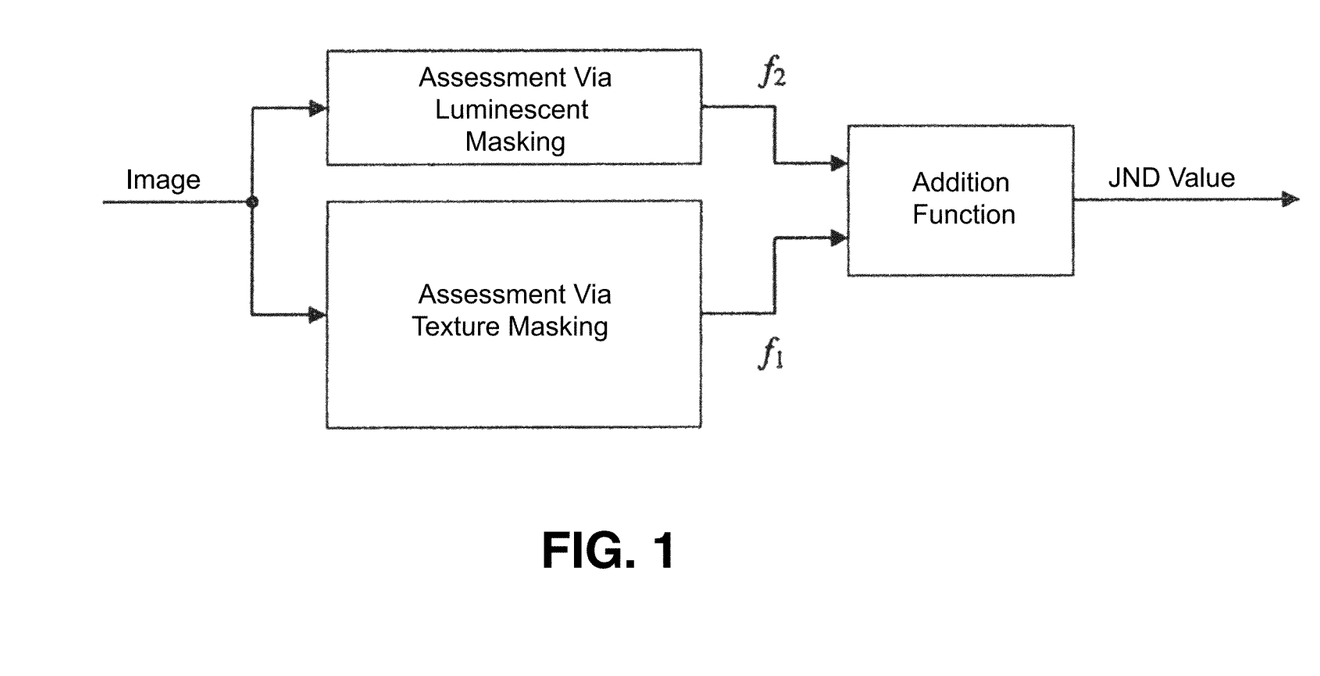
FIG. 1 Shows a schematic visualization of the fundamental blocks of a JND model in the pixel domain.

FIG. 1 shows a schematic visualization of the fundamental blocks of a just-noticeable-distortion (JND) algorithm in the pixel domains using the example of an image. The image is assessed via luminescence masking on the one hand, and on the other hand via texture masking, i.e. for example via a contrast measurement, via edge detection, or via texture classification. The resulting output results $f_1$ and $f_2$ are merged via a non-linear additive function via which just-noticeable distortion and/or a JND value is determined.

The JND value is a perception threshold that indicates the deviation of a value from the original value, e.g. of a compressed pixel grayscale value from the original grayscale value, causes a perceivable deterioration in quality, e.g. in image quality. In particular, the JND model takes into account known properties of the human visual system (HVS).

To determine the JND value, there are a series of state-of-the-art mathematical models. In the spatial domain, the JND value is typically determined on the basis of an N×N block of the original image by measuring known HVS masking effects like luminescence masking and texture masking. The principal differences between the JND models in the pixel domain suggested up to now are found in the various approaches to assessing the texture masking effects and in the addictive function used.

The following briefly describes an exemplary JND model:

Let bg(i, j) be the average local background luminescence and mg(i, j) be the maximum local luminescence activity within a block, which is centered around pixel location (i, j). Furthermore, let p be a pixel value. Then:

$$bg(i, j) = \frac{1}{32}\sum_{m=1}^{5}\sum_{m=1}^{5} p(i-3+m, j-3+n) \cdot B(m, n) \quad (1)$$

and $$mg(i, j) = \max|grad_k(i, j)| \quad (2)$$
$$k = 1, 2, 3, 4$$

with $$grad_k(i, j) = \frac{1}{16}\sum_{m=1}^{5}\sum_{m=1}^{5} p(i-3+m, j-3+n) \cdot G_k(m, n). \quad (3)$$

Figure 2:
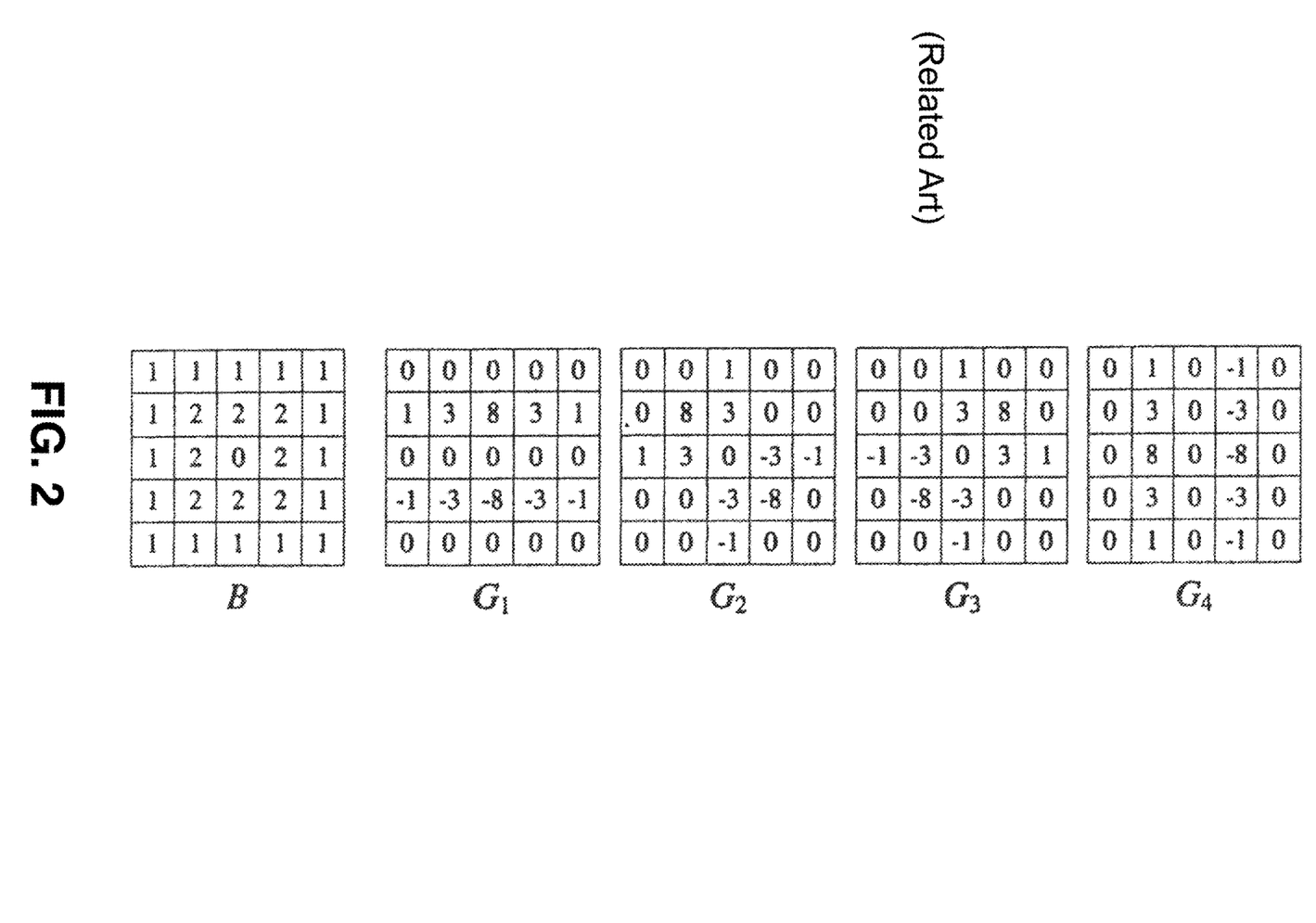
FIG. 2 Shows matrices for determining the average background luminescence and the local contrast in four directions.

FIG. 2 shows the values for B and $G_k$. Furthermore, let $f_1(i, j)$ be a model for the texture masking effect and $f_1(i, j)$ be a model for the luminescence masking effect. Then the JND threshold is yielded for:

$$JND(i, j) = \max\{f_1[bg(i, j), mg(i, j)], f_2[bg(i, j)]\} \quad (4).$$

As equation (4) shows, the JND value is determined by the effect of texture masking and the effect of luminescence masking. For further details, especially regarding the determinations of f1 and f2, please refer to the publication C._h: Chou and Y.-C. Li, "A perceptually tuned subband image coder based on the measure of just-noticeable-distortion profile," Circuits and Systems for Video Technology, IEEE Transactions on, vol. 5, no. 6, pp. 467-476, December 1995.

For the invention's method and/or the invention's device, the JND algorithm described above can be used to determine the tolerance range and/or the tolerance limit. It is self-evident, however, that fundamentally speaking other algorithms or models for determining the tolerance range can also be made.

This especially applies for technical applications for which no JND function exists.

Figure 3:
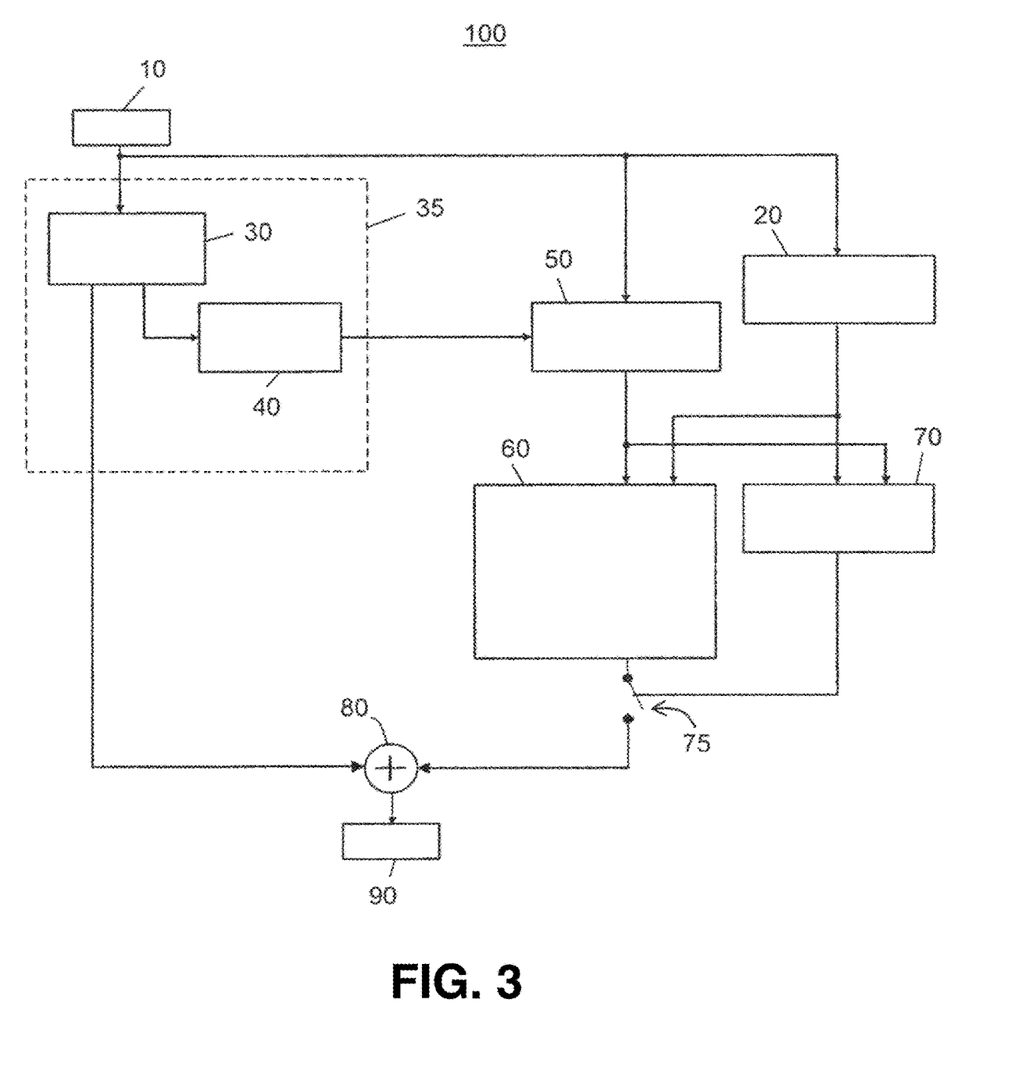
FIG. 3 Shows a schematic visualization of the process and/or the device pursuant to an embodiment of the invention.

FIG. 3 shows a schematic visualization of the process and/or the device 100 pursuant to an embodiment of the invention.

With device 100, an input dataset 10 can be compressed and an output dataset 90 can be supplied and/or emitted. The device 100 encompasses a tolerance range determination unit 20, a lossy encoder 30, a decoding unit 40, a subtraction unit 50, a correction value generation unit 60, a comparison unit 70, and an output dataset supply unit 80 for supplying the output dataset 90. The lossy encoder 30 and the decoder 40 comprise a lossy CODEC 35.

With the help of the tolerance range determination unit 20, for each i-th value of input dataset 10, a tolerance range T(i) is determined. The tolerance range can be determined for each value of input dataset 10 irrespective of location and based on the values neighboring the respective value. Determination of the tolerance range can especially be based on a just-noticeable-distortion algorithm, as was elucidated in an exemplary manner via FIGS. 1 and 2. However, it is also possible for the tolerance range to be determined, indicated, or specified in another manner. In thermography, for example, the tolerance range can depend on the temperature value itself. For example, for dimensional measuring of images, the tolerance range can be equal to or nearly zero for the images' edges, i.e. they can be set very small, as the image edges can influence the measured values.

With the aid of encoder 30, encoded lossy values are generated on the basis of the input values and/or the input dataset 10. One or multiple of these values can violate the tolerance range, i.e. lie outside the tolerance range and therefore evoke perceptible distortion.

In order to find the values lying outside of the tolerance range, decoded lossy values associated with the input values are generated with the aid of decoding unit 40. Decoding unit 40 is a unit for generating decoded values. Preferably, decoding unit 40 is a decoder.

The decoded data and/or the decoded lossy values can, for example, be generated via decoding the encoded lossy values. However, the decoded data can be generated not only via direct and/or complete decoding, but rather also in another manner. The following lays out two examples to that end:

An encoder typically consists of three parts. The first part determines signal transformation for a different of the i-th input value from an estimated value. The second part performs a quantization that generates the losses, and the third part performs a lossless entropy-encoding. Now, if instead of the data at the output of the entropy encoder, the data after quantization, i.e. prior to entropy encoding, are transferred into decoding unit 40, then no entropy decoding has to be performed in this unit 40.

Another example for a decoding unit 40 that determines the decoded data without decoding via a decoder, is a unit that can determine the decoded data directly from the original data via an analytical formula. One example for this kind of formula would be increasing every odd i-th value by one grayscale value and lowering every even i-th value by one grayscale value. The prerequisite for applying this formula is that it precisely describe the change in the values at the input via lossy encoding.

Each decoded lossy value is subtracted with the aid of subtraction unit 50 from the respective input value of input dataset 10, which generates differential values.

Each of the generated differential values is compared with the aid of comparison unit 70 with the associated tolerance range determined, i.e. for each value of input dataset 10, this kind of comparison is performed and, for example, a comparison value is determined.

With the aid of correction value generation unit 60, encoded values are generated on the basis of the differential values. For example, a lossless or a lossy compression of the differential value is performed for one i-th or for each i-th lossy value.

Depending on the comparison results of comparison unit 70, an output dataset 90 is supplied with the aid of the output dataset supply unit 80. If a value decoded with the decoding unit and/or with decoder 40 does not lie in the tolerance range, then the associated correction value, especially the respective lossless or lossy compressed differential value, is transferred to the lossy value compressed with encoder 30 and/or to the associated lossy value compressed with encoder 30. This decision criterion is indicated in FIG. 3 with the aid of switch 75.

Therefore, the output dataset 90 encompass the lossy values compressed with encoder 30 and/or the transferred correction values and/or a combination of thereof. In particular, the output dataset can encompass a bit stream, which is comprised of a bit stream of the lossy compressed values that partially violate the tolerance range, and an additional bit stream of compressed correction values and/or differential values.

For example, the data from the lossy values and the correction values can alternatingly be transferred in a time multiplex process.

Figure 4:
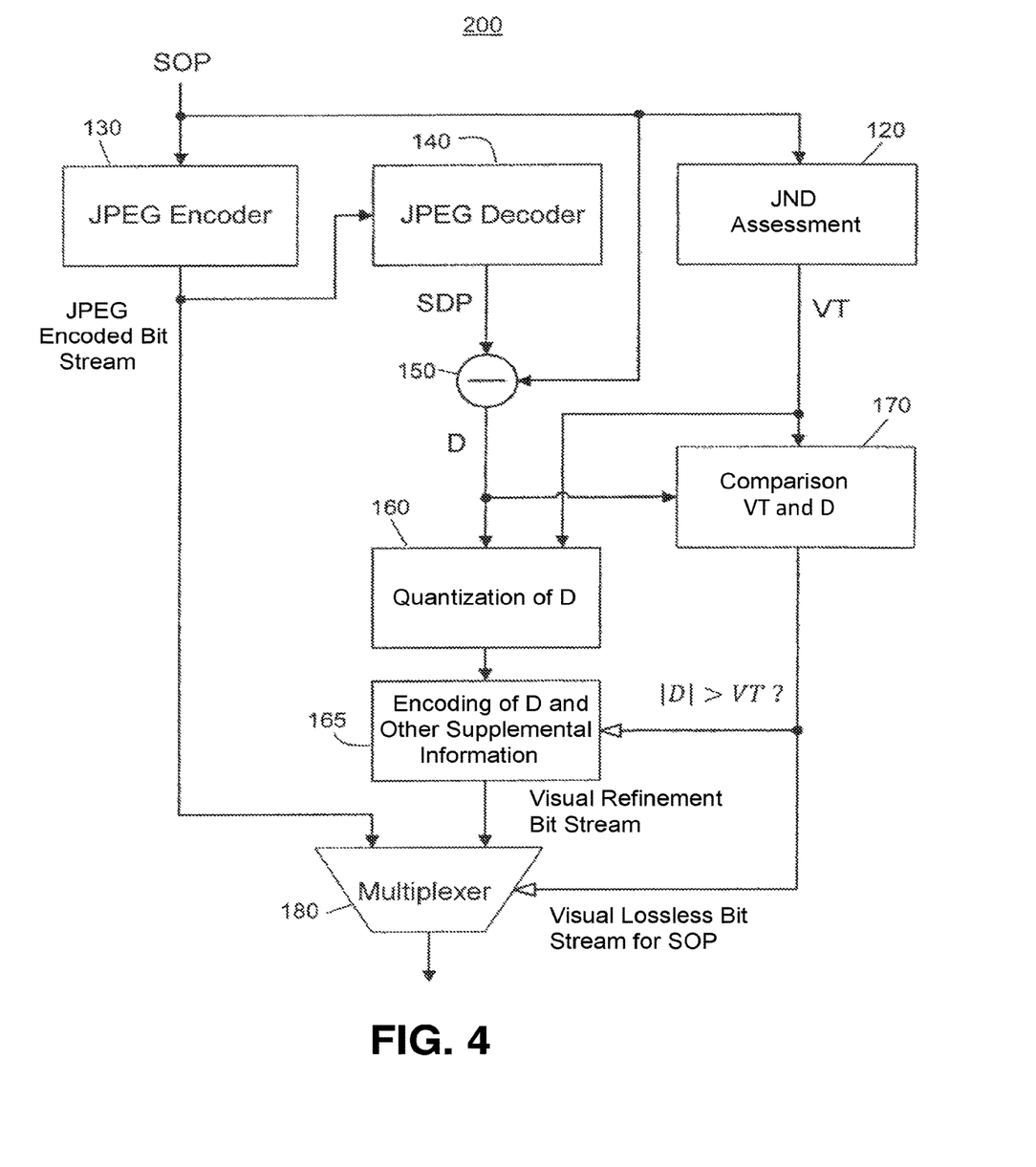
FIG. 4 Shows a schematic visualization of the invention's method and/or the invention's device based on an example image compression via JPEG.

In order to characterize the beginning and the end of the alternating data from the lossy values and the correction values of these transfers, markers can be inserted in the form of keywords in the data stream, or time allocations are defined for transferring the data. FIG. 4 shows a schematic visualization of a process and/or a device 200 pursuant to an exemplary embodiment in this invention. This exemplary embodiment performs image compression with the aid of the JPEG CODEC. Therefore, device 200 can also be described as a visually lossy encoder.

Device 200 encompasses a standard JEPG encoder 130 and a standard JEPG decoder 140; a spatial domain just-noticeable-distortion measuring unit 120; a decision or comparison unit 170, which performs a comparison of the distortion caused by JPEG compression and the perception threshold value determined by JND measuring unit 120; and a correction value generation unit, which in this embodiment example consists of a quantization unit 160 and an encoding unit 164, and which supplies and/or encodes refinement information for those JPEG-encoded pixels whose distortion transgresses the perception threshold value.

The input of the device 200 shown in FIG. 4 is a set of original pixels (SOP) to be encoded. An SOP can be, for example, in the case of JPEG an 8×8 block of an original image. The SOP comprises the input dataset of the standard JPEG encoder 130, which generates a JPEG-encoded bit stream for the SOP. The encoded bit stream or an equivalent set of information, e.g. quantized coefficients of a discrete cosine transformation, is now forwarded to the online JPEG decoder 140, which reconstructs a set of decoded pixels (SDP). The distortion D incurred due to the JPEG compression is indicated via the difference between SOP and SDP. In the meantime, and/or simultaneously, a visibility threshold (VT) is determined and/or measured for each pixel of the SOP via the JND model in the pixel domain and/or via the JND unit 120. After a pixel comparison between D and VT, locations at which distortions occur exceeding the visibility threshold are marked as locations showing a perceivable and/or visual distortion. Thus, the visual quality at these kinds of locations must be improved for visually lossless encoding and/or compressing. If a pixel location and/or a pixel has to be refined, then distortion associated with the pixel is compressed via quantization and/or a quantization unit 160 and then together with further supplemental information, such as location, quantization threshold, etc., entropy-encoded with the entropy encoder 165. During quantization, it should be guaranteed that the final decoded pixel has a maximum distortion that is permitted via VT.

All encoded information for refining pixel quality beyond standard JPEG is termed visual refinement bit stream. Finally, the bit stream generated by the JPEG encoder 130 is combined with the aid of a multiplexer 180 with the visual refinement bit stream in order to map the visual lossless bit stream for the SOP.

Contrary to conventional image encoders with which the original image is only used for compression, the invention's method additionally uses the original image in order to determine the distortion that is caused by the standard JPEG compression and in order to determine a perception threshold based on a known JND model. The encoding of the visual refinement information for JPEG-coded pixels with distortions beyond the perception threshold is based on a quantization of the distortion and a transfer of the location of the perceivable and/or visual distortion.

Figure 5:
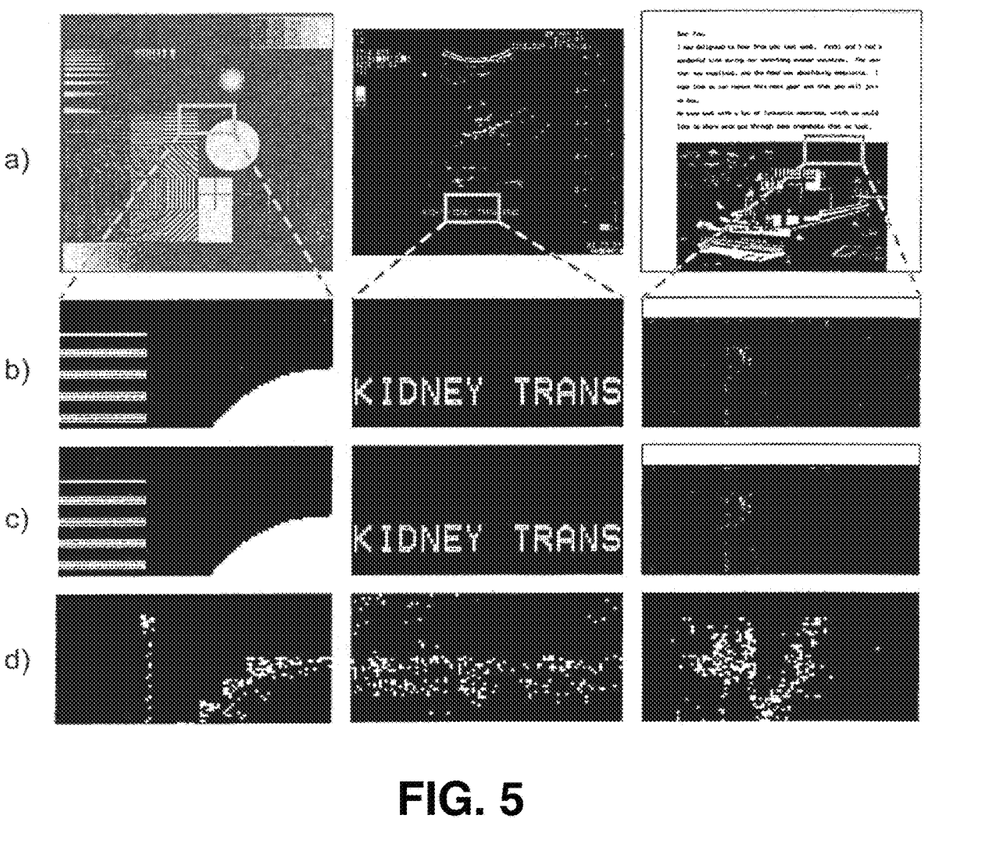
FIG. 5 Shows photographic figures for perceptual distortion in an exemplary standard JPEG compressed image, with a) three original images, b) one augmented section of each of the three original images, c) the corresponding augmented sections of the JPEG-compressed image, and d) the visually perceivable distortions of the JPEG-compressed images are visualized in the corresponding sections pursuant to JND.

The effectiveness from use of the JND model described above in order to find out the perceivable distortions in a standard JPEG-decoded image is illustrated in FIG. 5.

FIG. 5 shows photographic images for perceivable distortion in an exemplary standard JPEG-compressed image. FIG. 5*a*) shows three original images, while FIG. 5*b*) shows an augmented section of each of the three original images. FIG. 5*c*) shows the corresponding augmented sections of the JPEG-compressed image with a quality factor of 85, and FIG. 5*d*) presents the visually perceivable distortions of the JPEG-compressed images with the corresponding augmented sections that were determined using the JND model.

For each pixel in the augmented section in FIG. 5, the difference between the original pixels and the JPEG-decoded pixels is determined and compared with a perception threshold value that was determined using the JND model based on the original image. These kinds of pixel ranges, for which the JPEG-coded distortions lie above the perception threshold value, are presented in FIG. 5*d*) as white points. A clear correlation can be established between the pixel locations in the JPEG images in FIG. 5*c*), in which a distortion is perceivable, and the pixel locations marked as white points in FIG. 5*d*).

For the case that a decoded pixel was found with the aid of the JND model with a perceivable distortion due to standard JPEG compression, according to the invention a correction or refinement value for this pixel is transferred and/or sent in supplement to the standard JPEG bit stream. This correction value can be viewed as a deterministic offset value, which is added to the standard JPEG-decoded pixel value such that the distortion in the final decoded pixel lies within the JND tolerance range and/or below the JND threshold value.

For the generation and/or transfer of the correction value, in principle the two following possibilities exist:
i) Transfer of the difference between the JPEG, induced distortion and the JND threshold value, or
ii) Transfer of the JPEG-induced distortion itself.

In case i), the differential value must be encoded lossless, as otherwise it cannot be guaranteed that the distortion in the decoded pixel lies within the tolerance range of the JND model. In case i), a distortion in the finally decoded image is always equal to the JND threshold value.

In contrast, case ii) permits a lossy compression, e.g. via quantization of the correction value such that the final decoded pixel value lies within the blurring range for the original pixel value, with the blurring range specified by the JND threshold value. The quantization unit then has to secure an upper distortion limit.

For example, the following quantization can be used:

$$Q(\varepsilon_{i,j}) = \text{sign}(\varepsilon_{i,j}) \left[ \frac{|\varepsilon_{i,j}| + \delta_{i,j}}{2\delta_{i,j} + 1} \right], \tag{5}$$

where i, j are the lines and column indices of a pixel, and where $\varepsilon_{i,j}$ is the JPEG-induced distortion. The lossy coding parameter δ specifies the maximum coding error. The size of the quantization step is defined by 2δ+1. In JPEG-LS, the value of δ for a complete scan is fixed. Since JND provides the perception threshold value for the final decoded distortion, $\delta_{i,j}=|JND(i,j)|$ can be used, which effectively limits the perceptibility of quantization artifacts. Dequantization can be performed as follows:

$$\hat{\varepsilon}_{i,j} = Q(\varepsilon_{i,j}) \cdot (2\delta_{i,j}+1) \tag{6},$$

where XXX is a dequantized distortion. Equation (6) makes it clear that a decoder requires information about the pixel location as well as about the lossy quantization parameter, which depends on the JND value measured at the pixel location (i, j).

For improved coding efficiency, the transfer of the lossy quantization parameter can be omitted by predefining it as the lower limit of all JND values that were measured over the entire image. It can be shown that under normal observation conditions, the lower limit of the JND value is equal to 3. Thus, XXX was set for the results presented within the scope of this invention, where N depends on the respective image size.

The quantized correction value can be encoded with the help of a hardware-efficient entropy encoder. The remaining information required for decoding consists of the locations of the JPEG-decoded pixels whose distortions exceed their respective perceptibility threshold values.

Figure 6A:
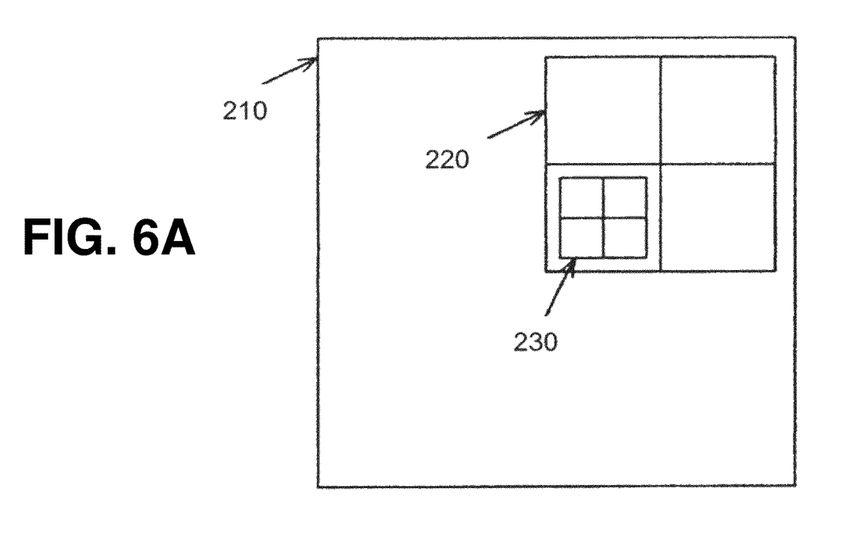
FIG. 6a Shows a schematic visualization of a quadtree of an 8×8 block in 2×2 sub-blocks.

In order to signal the location of a JPEG-decoded pixel whose distortion exceeds its perception threshold value, a so-called quadtree can be used. FIG. 6*a*) shows an example of a subdivision of an 8×8 block 210 into four 4×4 sub-blocks 220, where each of the 4×4 sub-blocks 220 in turn can be subdivided into four 2×2 sub-blocks 230.

A first bit is initially sent to infer whether the current set of JPEG-decoded pixels, i.e. an 8×8 block, contains a perceivable distortion. If the 8×8 block contains perceivable distortions, then it will be subdivided and the four 4×4 sub-blocks will again be examined for pixels with perceivable distortion.

Figure 6B:
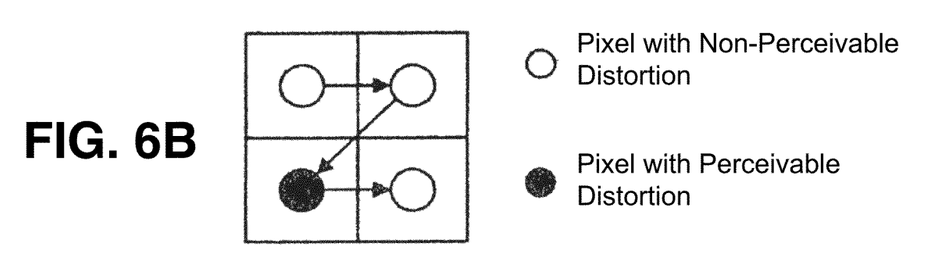
FIG. 6b Shows an exemplary grid scan in a 2×2 sub-block for determining correction and/or refinement values.

A single bit is sent for each 4×4 sub-block to infer whether it contains a perceivable distortion. If it contains perceivable distortion, then the 4×4 block will be sub-divided and each of the 2×2 sub-blocks created will be examined via grid scanning, as shown in FIG. 6*b*, for pixels with a perceivable distortion.

Figure 7:
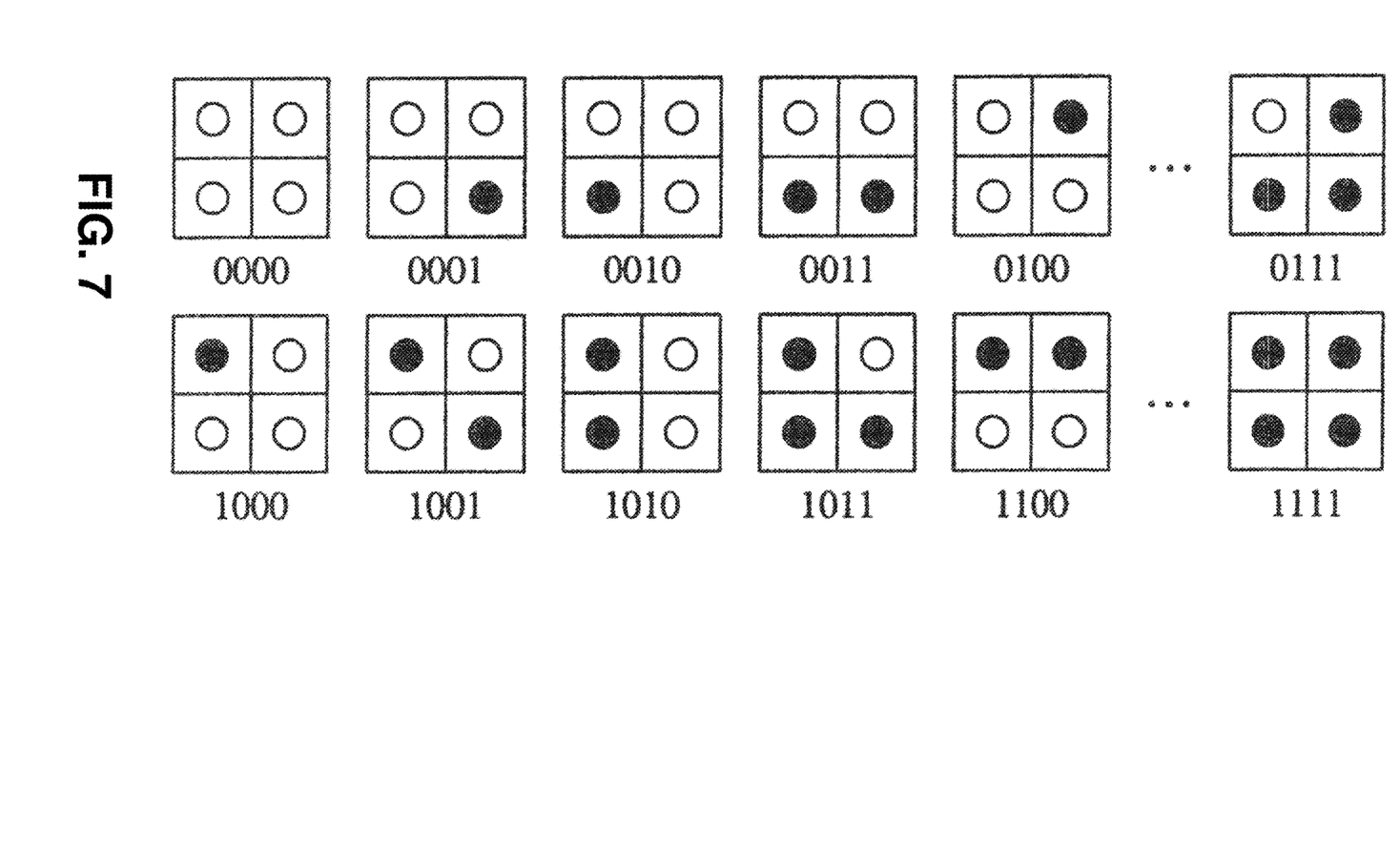
FIG. 7 Shows the 16 potential fixed patterns of a 2×2 sub-block.

After each scan, a refinement pattern consisting of 4 bits is generated, where one bit has the value 1 if the scanned pixel shows perceivable distortion, and otherwise 0. FIG. 7 shows the 16 potential refinement patterns for a 2×2 sub-block.

Therefore, for each set of original pixels, three types of local distortion information can be signaled and/or transferred:
1 bit distortion perception for the 8×8 block,
1 bit distortion perception for the 4×4 block,
4 bits distortion perception for each 2×2 block.

On the level of the 8×8 block, the 1 bit distortion perception information did not show any significant unbalanced distribution. Therefore, this bit was sent without entropy encoding for the tests made within the scope of this invention. Accordingly, no entropy encoding was performed for the 1 bit distortion perception information of the 4×4 block, too. In contrast, within the 2×2 sub-block, the refinement pattern showed an uneven distribution, such that entropy encoding is sensible here and applied, e.g. in accordance with Huffmann.

Figure 8:
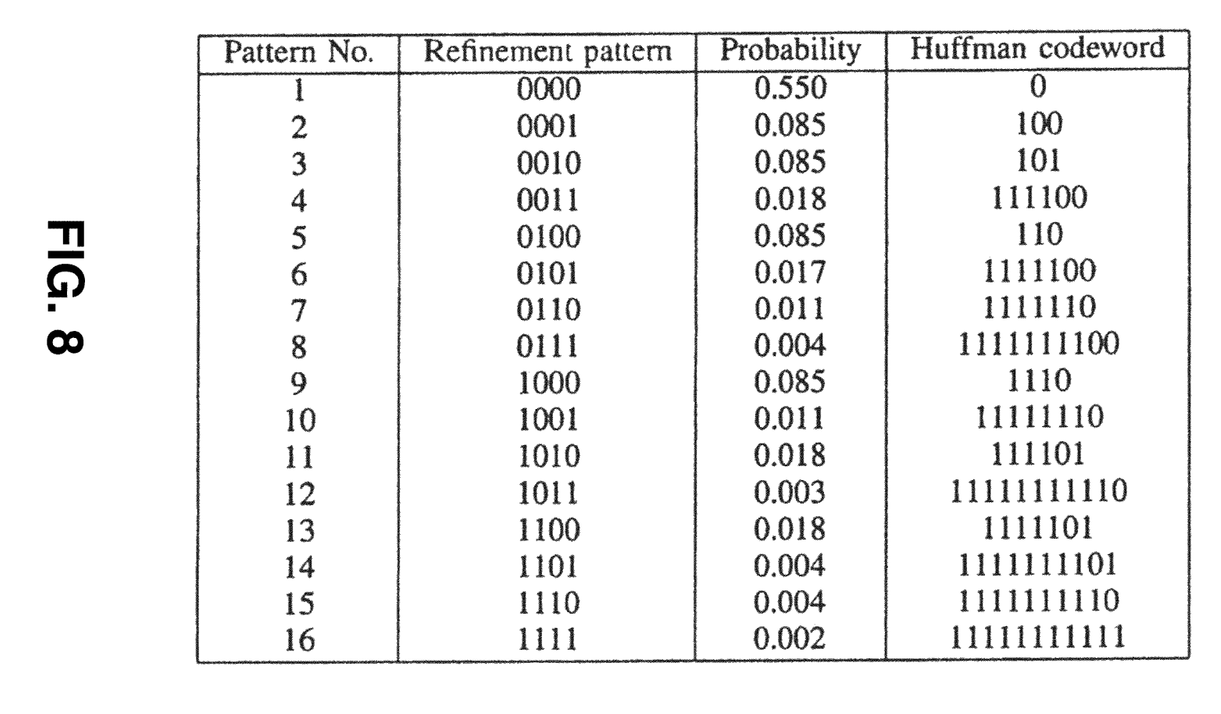
FIG. 8 Shows a table with the probability distribution of the fixed grids and the associated Huffmann code word.

The table in FIG. 8 shows the probability distribution for the refinement patterns and the corresponding Huffman codes, although it is noted that the distributions were measured using an average JPEG quality as base codec.

Figure 9:
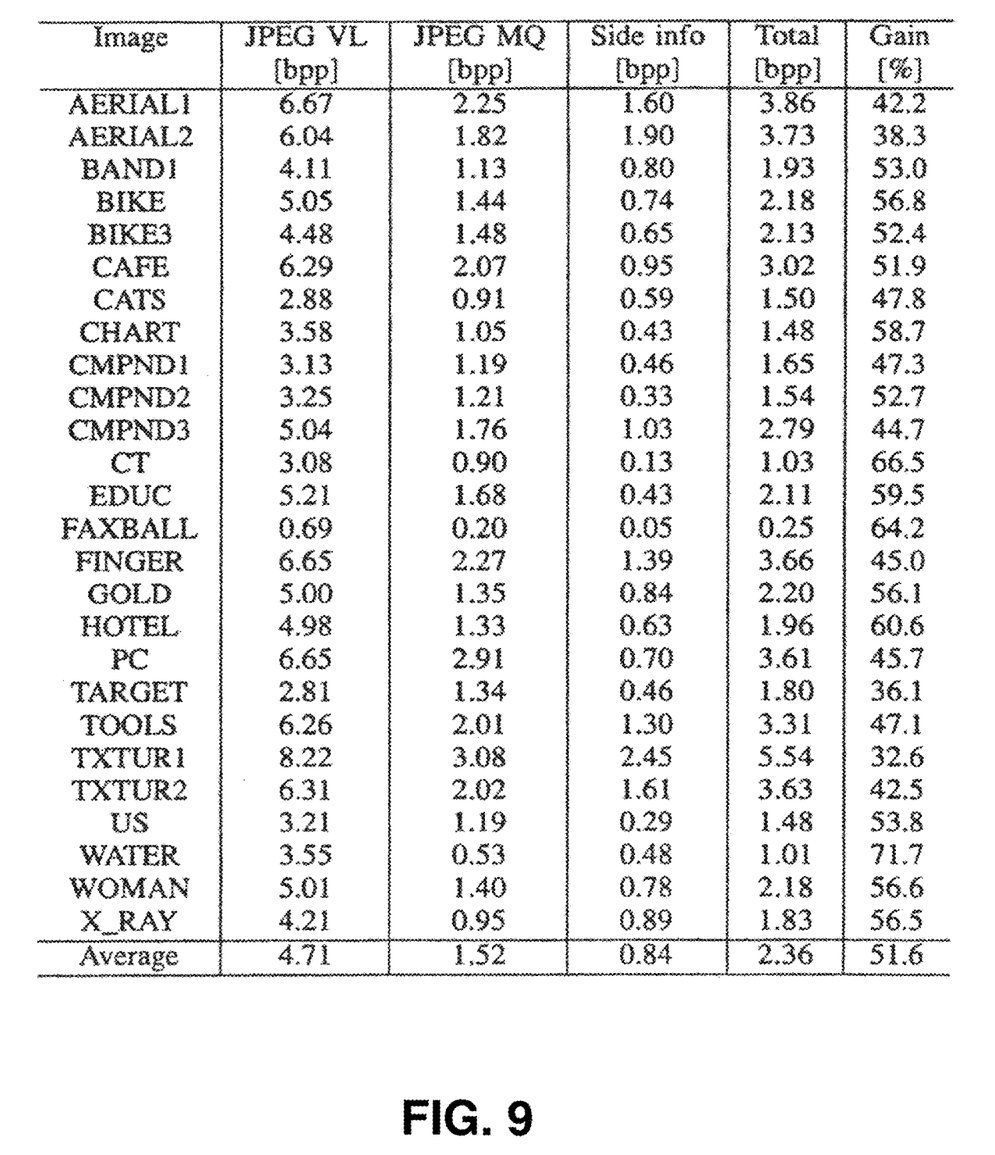
FIG. 9 Shows a table for compression performance of the invention's method and/or the invention's device compared to the compression performance of a standard JPEG image.

The table in FIG. 9 shows experimental results from the invention's method compared to conventional standard JPEG compression of ITU-T test images. In the second and third column of this table, the respective compressed size is indicated in bits per pixel (bpp) for a JPEG compression with higher quality, i.e. for visually lossless JPEG-compression (JPEG VL), and a JPEG compression with medium quality (JPEG MQ). The fourth column in the table shows the size of supplemental information (side info), which is generated in the invention's method by, for example, generating the correction values. The fifth column in the table indicates the overall size pursuant to the invention's method, while the sixth column shows the percentage of improvement (gain) of the invention's method compared to conventional standard JPEG compression with the same image quality.

As can be seen in FIG. 9, compared to the conventional standard JPEG codec, the performance of the invention's method is between 30% and 70% higher, i.e. an average of approximately 50%.

Figure 10:
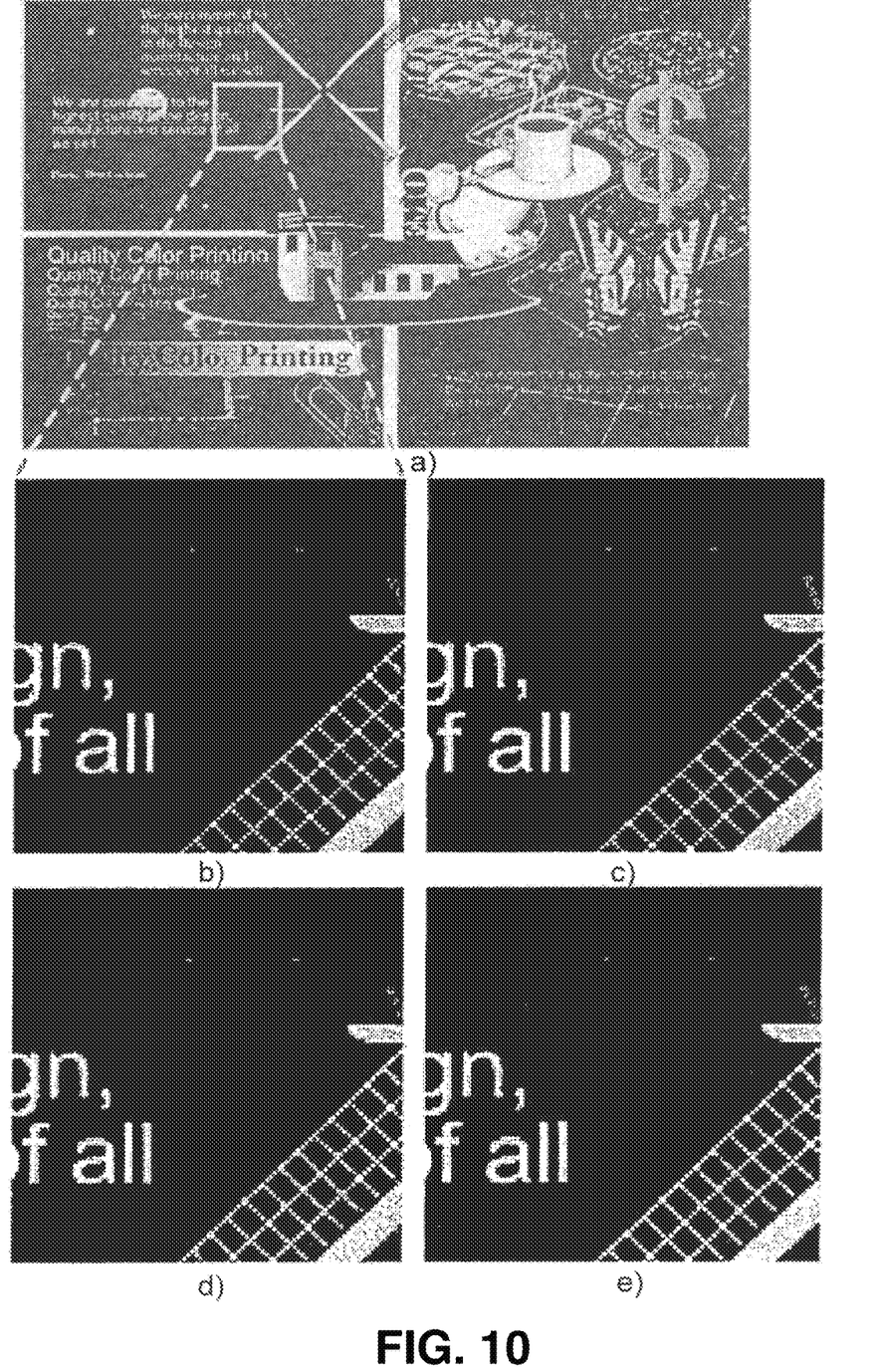
FIG. 10 Shows photographs of the visual comparison of an image compressed with the invention's method with a corresponding JPEG-compressed image, with a) the original test image, b) an augmented section of the original test image, c) a visually lossless JPEG-image of the augmented section, d) a JPEG image of the augmented section of medium quality, and e) an image of the augmented section compressed with the invention's method.

FIG. 10 shows a visual comparison of the original image (image a and/or b), of the corresponding JPEG-compressed image with higher quality (image c), of the corresponding JPEG-compressed image with medium quality (image d), and of the corresponding image compressed with the invention's method (image e). It can be seen in FIG. 10 that the image e) compressed using the invention's method has comparable quality with the JPEG-compressed image with higher quality, i.e. image c); and that a difference to original image b) is hardly recognizable. Furthermore, it can be seen that perceivable artifacts arising in the JPEG-compressed image of medium quality. i.e. in image d), could be effectively reduced and/avoided via the invention's method.

The invention's method and/or the invention's device can be implemented in an efficient manner in standard software and/or hardware, especially in real-time software and/or or hardware that is also compatible with conventional compression standards.

REFERENCE LIST

10 Input dataset
20 Tolerance range determination unit
30 Lossy encoder
35 Lossy codec
40 Decoding unit/decoder
50 Subtraction unit
60 Correction value generation unit
70 Comparison unit
75 Symbolic switch
80 Output dataset supply unit
90 Output dataset
100 Device/perceivably lossy encoder
120 Just-noticeable-distortion unit
130 JPEG encoder
140 JPEG decoder
150 Subtraction unit/subtractor
160 Quantization unit
165 Entropy encoder
170 Comparison unit
180 Multiplexer
200 Device/visually lossless encoder
210 8×8 block
220 4×4 sub-block
230 2×2 sub-block

The invention claimed is:

1. A method for compressing an input data set comprising one or more input values, the method comprising:
   determining a tolerance range for each input value;
   generating encoded lossy values by lossy encoding of the input values;
   generating decoded lossy values associated with the input values by decoding the encoded lossy values;
   generating difference values by subtracting each decoded lossy value from the respectively associated input value;
   comparing each difference value with the respectively associated determined tolerance range;
   generating encoded correction values on the basis of the difference values, wherein:
      generating encoded correction values includes generation of the encoded correction values associated with the encoded lossy values on the basis of the difference values, and
      the generated encoded correction values are offset values for adding to the associated encoded lossy values; and
   providing an output dataset based on a comparison of the difference values with the tolerance ranges and based on the encoded lossy values and/or the encoded correction values.

2. The method according to claim 1, wherein generating the encoded correction values comprises lossless or lossy encoding and/or compression of the difference values.

3. The method according to claim 1, wherein generating the encoded correction values comprises lossless encoding and/or compression of the difference between the difference values and a tolerance limit.

4. The method according to claim 1, wherein generating the encoded correction values is based on the comparison of the difference values with the tolerance ranges.

5. The method according to claim 1, wherein encoded correction values are generated only for such difference values that lie outside the respectively associated determined tolerance range.

6. The method according to claim 1, wherein providing the output dataset includes generating the encoded lossy values and/or the encoded correction values and/or providing combined encoded values, wherein the combined encoded values are a combination of the encoded lossy values and the encoded correction values.

7. The method according to claim 1, wherein providing the output dataset comprises providing combined encoded values, wherein the combined encoded values are obtained by merging the encoded lossy values and the encoded correction values having associated difference values that lie outside the associated determined tolerance range.

8. A device for compressing an input data set, which comprises one or more input values, the device comprising:
   a tolerance range determination unit configured to determine a tolerance range;
   an encoder configured to generate encoded lossy values by lossy encoding of the input values;

a decoding unit configured to generate decoded lossy values associated with the input values by decoding the encoded lossy values;
a subtracting unit configured to subtract each decoded lossy value from the respectively associated input value and generate difference values;
a comparison unit configured to compare each difference value with the respectively associated determined tolerance range; and
a correction value generation unit configured to generate encoded correction values based on the difference values, wherein
 generating encoded correction values includes generation of the encoded correction values associated with the encoded lossy values on the basis of the difference values, and
 the generated encoded correction values are offset values for adding to the associated encoded lossy values; and an output dataset supply configured to provide an output dataset based on a comparison of the difference values with the tolerance ranges and based on the encoded lossy values and/or the encoded correction values.

9. The device according to claim 8, wherein:
the encoder includes a JPEG encoder, an MP3-encoder, an MPEG encoder or a H265 encoder,
the decoding unit includes a decoder,
the tolerance range determining unit is configured to determine the tolerance range on the basis of a just-noticeable-distortion algorithm;
the correction value generating unit comprises a quantization unit and/or an entropy encoder, and/or
the output dataset supply unit comprises a multiplexer.

10. A computer program product comprising machine-readable program code which, when loaded on a computer, causes the computer to carry out a method according to claim 1.

* * * * *